April 30, 1963     S. P. FANNING, JR     3,087,218
RESILIENT CLOTHESPIN
Filed April 26, 1961

Samuel P. Fanning, Jr.
INVENTOR.

BY *Clarence A. O'Brien*
*and Harvey B. Jacobson*
Attorneys

United States Patent Office 3,087,218
Patented Apr. 30, 1963

3,087,218
RESILIENT CLOTHESPIN
Samuel P. Fanning, Jr., Roanoke, Va., assignor to Custom Plastics, Incorporated, Roanoke, Va., a corporation of Virginia
Filed Apr. 26, 1961, Ser. No. 105,743
7 Claims. (Cl. 24—137)

This invention relates to fastening devices, particularly to a clothespin-type of fastener adapted to secure clothes and other miscellaneous articles to a line, and the application is related to and an improvement upon my copending application Serial No. 75,016 filed December 9, 1960, now Patent No. 3,058,186.

The primary object of this invention is to provide a clothespin-type clamping device which has a plurality of pairs of separate gripping surfaces, certain of its surfaces being used to grip the clothes or articles being hung, and other of the surfaces being employed to grip the line on which the pin is hung for preventing sidewise or axial movement along the line.

It is another object of the invention to provide operating means for simultaneously operating all of the clamping surfaces simultaneously.

Another object of the invention is to provide a clothespin-type clamping device which may be operated by only one hand of the operator.

Still another object of the invention is to provide a clamping pin so designed that it is inherently resilient.

It is still another object of the invention to provide a clothespin-type clamping device for hanging articles on a line which has a positive locking device for adjustably locking the pin in any one selected position or a plurality of optional positions.

It is still another object of the invention to provide a clothespin-type clamp which has diverging spaced clamping surfaces for gripping articles of a plurality of thicknesses, or articles having a tapered or varying thickness.

It is yet another object of this invention to provide a clothespin with locking teeth wherein the teeth are so designed that the greater the force tending to open the clamp, the greater will be the holding ability of the teeth.

It is still another object of the invention to provide a clothespin-type clamp for hanging articles on a line which will automatically grip lines of various diameters when the pin is clamped on the line.

It is still another object of the invention to provide a clamping pin which is not only useful in hanging clothes on a line, but it is also useful in photo-labs for hanging film, hanging drapes, etc.

It is yet another object of the invention to provide a device that is useful as a surgical clamp or hemostat.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGRE 1 is a side elevational view showing the pin in a closed position attached to the clothesline;

Figure 1:
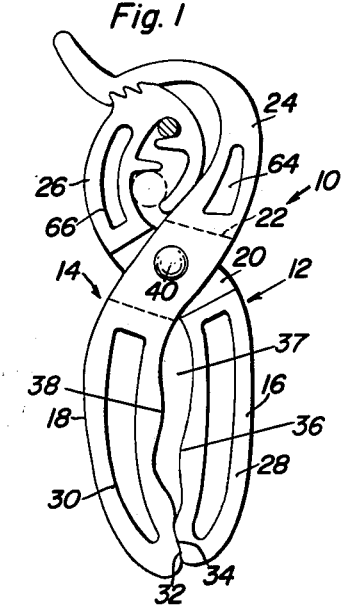

As shown in the drawings, the clamping pin 10 comprises an S-shaped lever 12 and a reversed S-shaped lever 14.

The levers 12 and 14 each have gripping jaws 16 and 18, central recessed pivot sections 20 and 22 and operating ends 24 and 26 respectively.

The gripping jaws 16 and 18 are preferably recessed as shown at 28 and 30 for savings in material and for reducing the weight of the structure. As shown in FIGURE 1, the gripping jaws have gripping surfaces 32 and 34 opposing one another. The surfaces 32 and 34 diverge up in an upward direction and merge with spaced gripping surfaces 36 and 38.

Figure 2:
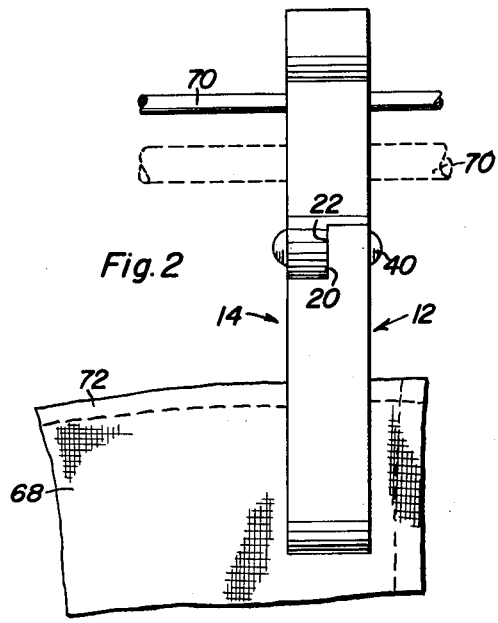
FIGURE 2 is a front elevational view of the device shown in FIGURE 1, showing the pin attached to a clothesline and holding a piece of material or clothing.

As shown more clearly in FIGURES 1 and 2, the recessed portions 20 and 22 are formed by removing material from the central portion of the levers so that a rectangular notch extending half-way through the thickness of the levers is formed in the central portion thereof. These notches of each lever receive the recessed portion of the adjacent lever as shown in FIGURE 2, and a pivot pin or rivet 40 having a head on each end thereof, extends through the middle of the recessed portions for pivotally connecting the levers together.

Figure 4:
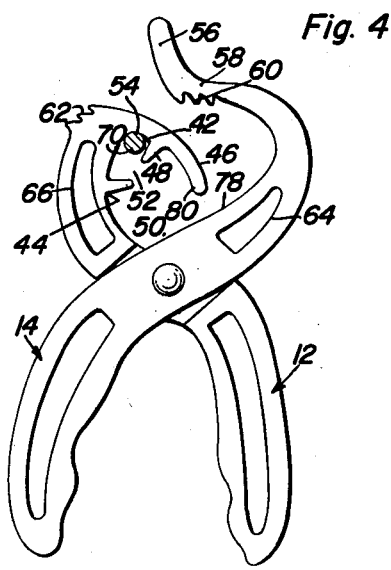
FIGURE 4 is a view similar to FIGURE 3 showing the pin in the open position.

As shown more clearly in FIGURE 4, the S-shaped lever 12 has two line receiving recesses. One recess which is of substantially U-shaped cross-section is shown at 42, and a second recess for receiving a larger line is shown at 44. The recess 42 is formed by the extreme upper end of the lever 12 and the base of a flexible finger 46 extending outwardly from the upper end of the lever 12 towards the upper end of the lever 14. Another portion of the recess 42 is formed by a movable projection 48 integrally formed with the finger 46 and extending downwardly from the lower surface.

The larger recess 44 is formed by inner curved surface of the operating end 26 of lever 12 and a projecting shelf 50. The shelf 50 is similar to the projection 48 in that it extends outwardly from the lever 12 and is integrally formed therewith. An access opening 52 is provided between the projection 48 and shelf 50 for entering of the relatively small line 54 into the recess 52.

The upper end of the lever 14 has an operating lug 56 integrally connected thereto by a relatively thin and flexible neck portion 58.

As shown in FIGURE 4, the neck portion 58 has formed on its lower surface a plurality of teeth 60 which slope downwardly and away from the operating end 26 of the lever 12. In a similar manner, the lever 12 has a plurality of teeth 62 formed on its extreme upper surface at the junction point between the operating end 26 and the finger 46, a plurality of teeth 62 which extend upwardly and away from the teeth 60.

The upper ends of each lever also have recessed portions 64 and 66 similar to the recess portions 28 and 30.

In operation, when it is desired to hang a piece of clothing 68 by means of the pin on a relatively small clothesline 70, the pin must be in the open position as shown in FIGURE 4, whereupon it is moved upwardly so that the line 70 may pass between operating lug 56 and finger 46 and then through access opening 52 into the small recess 42. The clothing 68 is moved upwardly so that its upper hem 72 is inserted into the space 37 formed between the surfaces 36 and 38. The operator then squeezes together the upper operating ends 24 and 26 of the levers so that they pivot about the pin 40 for clamping the jaws 32 and 34 against the clothing 68. The operator then continues to force the upper ends of the levers together so that the teeth 60 may ride over the upper surfaces of the teeth 62. This is permitted by the inherent flexibility of the levers. When the levers are in the fully closed position, the teeth 60 and 62 snap together as shown in FIGURE 1 for locking and retaining the levers in the closed position. The degree of pressure exerted between the clamping surfaces 32 and 34 is determined by the amount of closing pressure the operator applies between the operating ends 24 and 26, and the relative location of the final position of the locking teeth 60 and 62.

Even though the clothing 68 may be only lightly held between the clamping surfaces 32 and 34, and even though the clothing may slip down due to this light gripping pressure, the clothing will not fall or be completely released from between the clamping surfaces 32 and 34 because once the hem 72 contacts the upper edges of the clamping surfaces 32 and 34, further relative movement between the clothing and the pin will be prevented.

Figure 3:
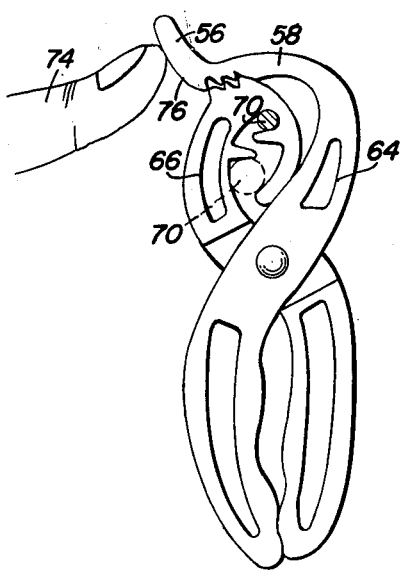
FIGURE 3 is a view similar to FIGURE 1 illustrating the manner of opening the clothespin.

In order to release or open the gripping jaws 16 and 18, it is only necessary for the operator to press his thumb as shown at 74 against the undersurface 76 of the operating lug 56 as shown in FIGURE 3 so as to bend the neck 58 which allows the teeth 60 to move upwardly and release from the teeth 62.

If the clothesline is relatively large in diameter as shown at 70', then the line is inserted into the relatively large recess 44 instead of the small recess 42. However, regardless of whether the line 70' or 70 is used, it is to be noted that in either case that each line is positively gripped by the clothespin when it is in closed position for preventing the pin and its load from moving sidewise or axially along the line on which it is supported. For example, referring to FIGURES 3 and 4, it can be seen that when the line 70 is used, the projection 48 is forced against the line when the pin is closed since the camming surface 78 on the lever 14 engages the upper outer surface of the flexible finger 46 and forces it inwardly towards the operating end 26. This causes the projection 48 to move upwardly and grip the line 70 within the recess 42. When the larger 70' line is used, the line gripping surface 78 on the lower portion of the finger 46 is forced inwardly toward the operating end 26 whereupon the line 70' is gripped between the recess 44 and the gripping surface 80.

The levers comprising the clothespin may be made of any conventional resilient material, such as plastic, wood, metal, etc.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A clothespin comprising a pair of companion similarly constructed levers having their respective mid-portions crossed and pivotally connected together and defining and providing a pair of depending opposed article gripping jaws and a pair of upstanding opposed clothesline accommodating clothesline embracing and suspending jaws, the upper end of one of said latter jaws having a portion thereof overlapping the upper cooperating end of the other jaw, said overlapping end portions being provided with coacting locking means which, when locked, serves to retain the respective upper and lower jaws in closed position, the upper end of one of the upper jaws being provided with a flexible resilient projection depending therefrom and interposed between opposed surfaces of said upper jaws, said projection being integral with said one jaw and defining a line seating recess, said projection having a free end portion shiftably engageable with a camming surface provided therefor on the complemental upper jaw.

2. The structure defined in claim 1 and wherein the locking means between said overlapping portions is adjustable in a manner to progressively regulate the space between the opposed surfaces of said upper jaws and to, in turn, progressively regulate the tension imposed on said projection when said upper jaws are pressed progressively together.

3. The structure defined in claim 1 and wherein the locking means between said overlapping portions is adjustable in a manner to progressively regulate the space between the opposed surfaces of said upper jaws and to, in turn, progressively regulate the tension imposed on said projection when said upper jaws are pressed progressively together and wherein a free end portion of one of said upper jaws is provided with an outstanding readily accessible lug constituting a fingerpiece.

4. The structure defined in claim 1 and wherein the locking means between said overlapping portions is adjustable in a manner to progressively regulate the space between the opposed surfaces of said upper jaws and to, in turn, progressively regulate the tension imposed on said projection when said upper jaws are pressed progressively together, the inner line contacting surface of one jaw being provided with a lateral detent projecting toward but terminating short of a median portion of said projection, and the adjacent surface of said projection being provided with a detent projecting toward the first-named detent but spaced therefrom whereby to provide selectively usable recesses for clotheslines of different cross-sectional dimensions.

5. The structure defined in claim 4 and wherein one of said levers is substantially S-shaped in plan, and the other lever is likewise S-shaped in plan but in a reverse manner.

6. A clothespin comprising a first substantially S-shaped lever, a second complemental substantially S-shaped lever, said levers having their respective mid-portions crossed and pivotally connected together and defining and providing a pair of elongated depending opposed clothes gripping jaws and also defining a pair of upper clothesline engaging, gripping and clothespin suspending jaws, an interior lengthwise surface of one of said upper jaws being curved and providing a cam, the free terminal end thereof being provided with a lateral terminal constituting a fingerpiece, the portion thereof adjacent said fingerpiece having retaining teeth, the upper end of the other upper jaw being overlapped by the cooperating portion of the first-named upper jaw and having selectively usable teeth engageable with said first-named teeth, said upper end having a longitudinally bowed extension which is resilient and which has an end portion defining a line seating recess, said extension having shiftable camming contact with the aforementioned cam surface.

7. The structure defined in claim 6 and wherein said extension is provided with a lug-like detent and an adjacent cooperating surface of the second-named upper jaw is provided with a lateral detent, said detents being spaced from each other and providing selectively usable recesses for accommodating retention of clotheslines of differing cross-sectional dimensions.

References Cited in the file of this patent

UNITED STATES PATENTS

| 2,064,591 | David | Dec. 15, 1936 |
| 2,213,376 | Bauer | Sept. 3, 1940 |
| 2,506,783 | Fauteux | May 9, 1950 |
| 2,563,236 | Gragg | Aug. 7, 1951 |
| 2,920,365 | Colangelo | Jan. 12, 1960 |

FOREIGN PATENTS

| 1,212,165 | France | Oct. 19, 1959 |
| 559,192 | Great Britain | Feb. 8, 1944 |
| 796,846 | Great Britain | June 18, 1958 |